United States Patent
Bruno et al.

(10) Patent No.: US 12,420,779 B2
(45) Date of Patent: Sep. 23, 2025

(54) METHOD FOR CONTROLLING A MOTOR VEHICLE TO AVOID A TARGET WITH EULER-SPIRAL PATH REFINEMENT

(71) Applicants: RENAULT S.A.S, Boulogne Billancourt (FR); NISSAN MOTOR CO., LTD., Yokohama (JP)

(72) Inventors: Geoffrey Bruno, Issy les Moulineaux (FR); Anh-Lam Do, Antony (FR); Khoa Duc Nguyen, Sartrouville (FR); Juan-Pablo Sanchez-Perez, Sannois (FR)

(73) Assignees: AMPERE S.A.S., Boulogne Billancourt (FR); NISSAN MOTOR CO., LTD., Yokohama (JP)

( * ) Notice: Subject to any disclaimer, the term of this patent is extended or adjusted under 35 U.S.C. 154(b) by 106 days.

(21) Appl. No.: 18/258,096

(22) PCT Filed: Dec. 16, 2021

(86) PCT No.: PCT/EP2021/086291
§ 371 (c)(1),
(2) Date: Jun. 16, 2023

(87) PCT Pub. No.: WO2022/129398
PCT Pub. Date: Jun. 23, 2022

(65) Prior Publication Data
US 2024/0034311 A1 Feb. 1, 2024

(30) Foreign Application Priority Data
Dec. 17, 2020 (FR) ..................................... 20 13448

(51) Int. Cl.
*B60W 30/09* (2012.01)
*B62D 15/02* (2006.01)

(52) U.S. Cl.
CPC ......... *B60W 30/09* (2013.01); *B62D 15/0265* (2013.01); *B60W 2520/10* (2013.01); *B60W 2540/18* (2013.01)

(58) Field of Classification Search
CPC ............. B60W 30/09; B60W 2520/10; B60W 2540/18; B60W 2050/0013;
(Continued)

(56) References Cited

U.S. PATENT DOCUMENTS 10,479,371 B1 * 11/2019 Kim .................... B60W 40/109
2015/0063648 A1 * 3/2015 Minemura .............. G06F 18/21
382/104
(Continued)

FOREIGN PATENT DOCUMENTS

FR 3 096 947 A1 12/2020

OTHER PUBLICATIONS

International Search Report issued Apr. 7, 2022 in PCT/EP2021/086291, 2 pages.
(Continued)

*Primary Examiner* — Joseph J Dallo
(74) *Attorney, Agent, or Firm* — Oblon, McClelland, Maier &Neustadt, L.L.P.

(57) ABSTRACT

A method controls a motor vehicle equipped with at least two perception sensors to avoid a target. The control method includes: determining data of the sensors, fusing the data of the sensors so as to determine the steering wheel angle, the vehicle speed and the vehicle heading, planning an avoidance path to avoid the target, taking the form of a Euler spiral, refining the avoidance path depending on the steering wheel angle, on the vehicle speed and on the vehicle heading and based on the solution of an optimisation problem, controlling the vehicle so as to follow the refined path, the refining the path including honing the avoidance path
(Continued)

depending on the path length, on the direction of steering wheel rotation and on the final heading and refining the honed trajectory depending on the initial heading and on the direction of steering wheel rotation.

12 Claims, 2 Drawing Sheets

(58) Field of Classification Search
CPC ....... B60W 2710/207; B60W 2720/10; B60W 2720/14; B60W 2520/20; B60W 2556/35; B62D 15/0265; B60Y 2300/09
See application file for complete search history.

(56) References Cited

U.S. PATENT DOCUMENTS

| | | | | |
|---|---|---|---|---|
| 2017/0015312 | A1* | 1/2017 | Latotzki | B62D 15/027 |
| 2018/0237000 | A1* | 8/2018 | Litkouhi | B60W 40/105 |
| 2021/0070288 | A1* | 3/2021 | Yamaoka | G06V 20/588 |
| 2021/0306243 | A1* | 9/2021 | Mori | G01S 19/48 |
| 2022/0327920 | A1* | 10/2022 | Jones | G08G 1/096775 |
| 2023/0159096 | A1* | 5/2023 | Horiguchi | B62D 15/021 |
| | | | | 701/41 |
| 2023/0234585 | A1* | 7/2023 | Debeauvais | B60W 50/0097 |
| | | | | 701/93 |

OTHER PUBLICATIONS

French Preliminary Search Report dated Aug. 31, 2021 in French Application No. 20 13448 (with English Translation of Categories of Cited Documents), 3 pages.

Gray et al., "Predictive Control for Agile Semi-Autonomous Ground Vehicles using Motion Primitives", 2012 American Control Conference, Fairmont Queen Elizabeth, Montreal, Canada, Jun. 27-Jun. 29, 2012, pp. 4239-4244, XP032244737.

Schwarting et al., "Parallel Autonomy in Automated Vehicles: Safe Motion Generation with Minimal Intervention", 2017 IEEE International Conference on Robotics and Automation (ICRA), Singapore, May 29-Jun. 3, 2017, pp. 1928-1935, XP033127013.

* cited by examiner

METHOD FOR CONTROLLING A MOTOR VEHICLE TO AVOID A TARGET WITH EULER-SPIRAL PATH REFINEMENT

TECHNICAL FIELD

The technical field of the invention is the path control systems, and more particularly such systems based on paths in clothoid form.

STATE OF THE ART

Some path control systems of a motor vehicle generate reference clothoid paths for an automatic avoidance system, or "automatic evasive steering" system (AES) in order to avoid a collision with obstacles detected on the road while ensuring that the driver maintains a good feeling on the steering wheel.

These reference paths in clothoid form take into account the controllability of the system (e.g. limit of the magnitude/gradient of the steering wheel angle) and certain comfort criteria (e.g. jerk, continuity of bend, etc.). However, despite all its performance levels, this robust approach to path planning lacks flexibility because it imposes strict constraints on the paths sought (that is to say the final angle of the steering wheel is equal to 0, the integral of the steering wheel angle profile is equal to 0) and because the non-zero initial conditions of the system are disregarded. That risks rendering the path tracking controller and the vehicle system unstable. For example, in the case where the absolute value of the heading of the vehicle upon the activation of the AES is sufficiently great, the controller forces the heading to zero to avoid being diverted from the reference clothoid path. Consequently, the steering wheel will turn against the natural avoidance inclination, a situation which proves uncomfortable and incomprehensible to the eyes of the driver. Furthermore, if the driver acts against this maneuver, by turning the steering wheel in the logical avoidance direction, and the system applies saturation constraints, then the latter becomes unstable and oscillating via the oscillation phenomenon induced by the pilot ("pilot induced oscillation").

There is therefore a need to correct the problem described above.

From the prior art, the following documents are known.

The French patent application FR2003457 describes a very restricted method imposing rigorous constraints on the planned paths (e.g. the final angle of the steering wheel is equal to 0, the integral of the steering wheel angle profile is equal to 0, etc.). If the initial conditions are non-zero, behaviors that are potentially destabilizing for the driver occur. For example, when there is an initial heading that is positive and fairly significant, the steering wheel is turned in the wrong direction at the start of the avoidance phase. This instability may be amplified if the driver intervenes on the steering wheel in the avoidance phase.

The document "Clothoid-based model predictive control for autonomous driving, P. Lima, J. Martensson and M. Trincavelli, ECC, Linz (2015)" discloses a control method for centering in the lane. Furthermore, this method does not take account of different constraints essential to the stability of the system, such as the controllability. Furthermore, this method can provoke discontinuities in the calculated path.

The document US 2008/0255728 describes the construction of clothoid curves from a known initial and final state, through a geometry of isosceles triangles containing a combination of clothoid forms. The objective of this document is to find a simple way to navigate from one point to another, to be applied to a problem of orientation rather than to minimize the time to collision TTC under dynamic constraints. Furthermore, this application does not take account of dynamic limits and there is no procedure to optimize the maneuver time for a given situation.

SUMMARY OF THE INVENTION

The subject of the invention is a method for controlling a motor vehicle for the avoidance of a target, the motor vehicle being provided with at least two perception sensors, the control method comprising the following steps:
    a step of determination of the data from the at least two sensors,
    a step of merging of the data from the at least two sensors so as to determine at least the steering wheel angle, the speed of the vehicle and the heading of the vehicle,
    a step of planning of a target avoidance path in the form of a clothoid,
    a step of refinement of the target avoidance path as a function of the steering wheel angle, of the speed of the vehicle and of the heading of the vehicle and based on the solving of an optimization problem,
    a step of control of the vehicle so as to follow the refined path, the path refinement step comprising a first series of substeps to further improve the avoidance path as a function of the length of the path, of the direction of rotation of the steering wheel and of the final heading and a second series of substeps to refine the improved path as a function of the initial heading and of the direction of rotation of the steering wheel.

The optimization problem can be a function of a reference longitudinal displacement, of a reference lateral displacement, of a reference vehicle heading, of a reference vehicle path curvature and of a decision vector comprising the speed of variation of the curvature of the path and the distance travelled with respect to the origin and empirically determined setting parameters, and constraints on the initial longitudinal displacement, on the initial lateral displacement, on the final lateral displacement, on the steering wheel angle, on the speed of rotation of the steering wheel and on the final heading value. This refinement thus makes it possible to correctly take account of the controllability imposed on the system by considering the constraints on the steering wheel angle, speed of rotation of the steering wheel in the optimization of the path. Taking these into account makes it possible to find a path, and, indirectly, a steering wheel angle profile, that is more reasonable and acceptable for the driver.

The first series of substeps can comprise the following substeps: initialization parameters of the optimization problem are determined as a function of the reference path and of the merged data, the initialization parameters comprising a reference longitudinal displacement, a reference lateral displacement, a reference vehicle heading, a curvature of the reference vehicle path, an initial heading of the vehicle, and an initial steering wheel angle, the optimization problem is solved and a determination is made as to whether an optimal solution exists by determining if the solution of the optimization problem corresponds to a minimum of a predefined cost function and if the solution of the optimization problem satisfies a constraint on the final heading of the vehicle; if such is the case, the steering wheel angle profile is determined from the instant of activation of the control method then a determination is made as to whether the sign of the steering wheel angle associated with the first extremum of the steering wheel angle profile has the same sign as the steering wheel angle of the reference path and if there is at most an extremum of sign opposite the first extremum over the duration of the optimized path; if such is the case, the solution of the optimization problem is considered as an improved path.

If it is determined that an optimal solution does not exist, it is possible to carry out the following steps: the path is extended by a predetermined duration, then the method is resumed at the solving of the optimization problem by taking account of the path extension, the predetermined duration being increased on each successive occurrence of determination that an optimal solution does not exist.

If the steering wheel angle profile is not satisfactory, it is possible to carry out the following steps: a longitudinal offset is applied to the reference path, and the optimization problem is solved again, then the method is resumed at the determination of the steering wheel angle profile, the longitudinal offset being increased on each successive occurrence of determination that the steering wheel angle profile is not satisfactory.

One constraint of the optimization problem can be that the longitudinal displacement of the points of the path sought must be equal to the longitudinal displacement of the points in the reference path, in order to ensure the smoothing of the refined path.

One constraint of the optimization problem can be that the final value of the heading of the vehicle of the refined path must lie within a restricted range of values, in order to stabilize the path of the vehicle after the avoidance.

One constraint of the optimization problem can be that the longitudinal displacement of the points of the refined path must be less than the lateral displacement of the extreme line not to be exceeded upon a correction.

One constraint of the optimization problem can be that the final value of the lateral displacement of the refined path must be greater than or equal to the final value of the lateral displacement targeted by the reference path.

The second series of substeps can comprise the following substeps: new initialization parameters are determined as a function of the refined path and of the merged data, a predetermined lateral offset is applied to the refined path and the optimization problem is solved, a determination is made as to whether an optimal solution exists by determining if it corresponds to a minimum of a predefined cost function; if such is the case, the steering wheel angle profile is determined from the instant of the control method and a determination is made as to whether the sign of the steering wheel angle associated with the first extremum of the steering wheel angle profile has the same sign as the sign of the steering wheel angle of the reference path and if there is at most an extremum of sign opposite the first extremum over the duration of the optimized path; if such is the case, the solution of the optimization problem is considered as a final refined path. Thus, the constraints on the steering wheel angle and on the lateral position combined with the offset on the initial lateral position guarantee finding the optimal path which does not require the steering wheel to be turned in the wrong direction, at the start of the avoidance maneuver, which makes it possible to improve the confidence of the driver and the stability of the vehicle.

If it is determined that an optimal solution does not exist, it is possible to carry out the following steps: the initial heading is reduced by a predetermined angular deviation then the method is resumed at the solving of the optimization problem, the angular deviation being increased on each successive occurrence as soon as an optimal solution does not exist.

If it is determined that the optimal solution does not satisfy the steering wheel angle constraints, it is possible to carry out the following steps: a longitudinal offset is applied to the refined path, the optimization problem is solved, then the method is resumed at the determination of the steering wheel angle profile, the longitudinal offset being increased on each successive occurrence of determination that the steering wheel angle profile is not satisfactory.

The predetermined duration, the angular deviation, and the longitudinal offset can be incremented successively by predetermined limit values. If such is the case, the refinement step is interrupted and the reference path is followed in the vehicle control step.

Also a subject of the invention is a control system of a motor vehicle for the avoidance of a target, the motor vehicle being provided with at least one perception sensor, and at least one computation means configured to carry out the control method as defined above.

BRIEF DESCRIPTION OF THE DRAWINGS

Other aims, features and advantages of the invention will become apparent on reading the following description, given purely as a nonlimiting example and with reference to the attached drawings in which.

DETAILED DESCRIPTION

The purpose of the control system described hereinbelow is to correct the problems of the states of the art by improving the clothoids generated by path planning in such a way that the behavior of the system upon an avoidance is comprehensible and acceptable to the driver. These reference paths are reconstructed by taking account of the initial conditions of the vehicle. Keeping the clothoid form, they are still subject to the constraints of controllability.

Figure 1:
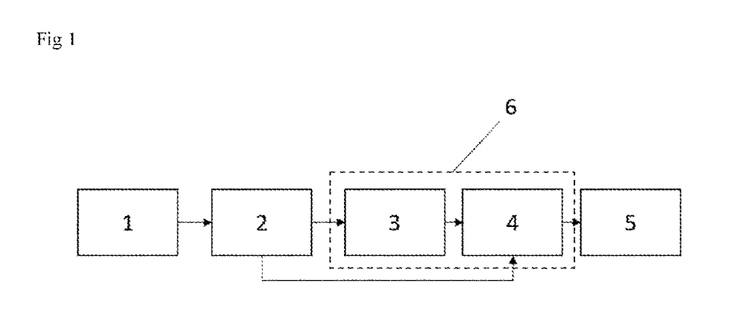
FIG. 1 illustrates the main steps of the control method of the present invention.

FIG. 1 illustrates the interfacing of the control method of the present invention with the state of the art.

A motor vehicle is provided with at least one sensor and a merging means configured to merge the data determined by the sensors and connected as input to at least one computation means configured to execute the steps of the following control method.

The control method according to the invention comprises a step of acquisition of data 1, a step of merging 2 of the acquired data, a step of determination 3 of a target avoidance path, a step of calculation 4 of a refined path and a step of control 5 of the movement of the vehicle ("Motion Control"). The step of determination 3 of a target avoidance path and the step of calculation 4 of a refined path are included in an automatic avoidance method 6 of AES type.

The calculation step 4 makes it possible to refine the path obtained from the step of determination 3 of a target avoidance path which constitutes conventional path planning.

The path refinement (or "path refining") makes it possible to improve the paths generated by the conventional path planning as a function of data received from the merging of data, notably the heading, the steering wheel angle and the speed of the vehicle at the moment of activation of the method.

The principle of path refinement is above all to find an approximation/linear model that makes it possible to describe a clothoid simply. This approximation/model will then be used to reformulate the "improved path" problem as a quadratic optimization problem.

The linear model of a clothoid will now be described.
The following equations define a path in clothoid form:

$$x(s_2) = x(s_1) + \int_{s_1}^{s_2} \cos(\theta(s)) ds \quad \text{[Math 1]}$$

$$y(s_2) = y(s_2) + \int_{s_1}^{s_2} \sin(\theta(s)) ds \quad \text{[Math 2]}$$

For two successive points i and i+1, situated on a same clothoid and $s_i$, $s_{i+1}$ their distance travelled from the origin, their equations can be approximated as follows:

$$x(s_{i+1}) \approx f_{x_i} = x(s_i) + (s_{i+1} - s_i) * \cos(\theta(s_{i+1})) \quad \text{[Math 3]}$$

$$= x(s_i) + s_i * \cos\left(\theta(s_i) + c_i * \frac{s_i^2}{2} + \kappa(s_i) * s_i\right)$$

$$y(s_{i+1}) \approx f_{y_i} = y(s_i) + (s_{i+1} - s_i) * \sin(\theta(s_{i+1})) \quad \text{[Math 4]}$$

$$= y(s_i) + S_i * \sin\left(\theta(s_i) + c_i * \frac{s_i^2}{2} + \kappa(s_i) * S_i\right)$$

$$\theta(s_{i+1}) = f_{\theta_i} = \theta(s_i) + c_i * \frac{s_i^2}{2} + \kappa(s_i) * s_i \quad \text{[Math 5]}$$

$$\kappa(s_{i+1}) = f_{\kappa_i} = \kappa(s_i) + c_i * s_i \quad \text{[Math 6]}$$

With
$s_i$: distance travelled from the origin to the point i over the path
$x(s_i)$: longitudinal displacement of the vehicle at the point i on the path with respect to the origin
$y(s_i)$: lateral displacement of the vehicle at the point i on the path with respect to the origin
$\theta(s_i)$: heading of the vehicle at the point i on the path
$\kappa(s_i)$: curvature of the path of the vehicle at the point i
$c_i$: speed of variation of the curvature of the path at the point i.

The equations ([Math 3]-[Math 6]) above are used as our model describing the desired path of the vehicle. If $X_i = (x_i, y_i, \theta_i, \kappa_i)$; $U_i = (c_i, s_i)$, is defined, these equations can be expressed simply as:

$$X_{i+1} = f(X_i, U_i) = \begin{bmatrix} f_{xi} \\ f_{yi} \\ f_{\theta i} \\ f_{\kappa i} \end{bmatrix} \quad \text{[Math 7]}$$

The linearization around the reference points of this model is expressed by:

$$\tilde{X}_{i+1} = A_i \tilde{X}_i + B_i \tilde{U}_i \quad \text{[Math 8]}$$

With $\tilde{X}_i = X_i - X_{ref\_i}$ in which $(X_{ref\_i} = (x_{ref\_i}, y_{ref\_i}, \theta_{ref\_i}, \kappa_{ref\_i})$
$\tilde{U}_i = U_i - U_{ref_i}$ in which $U_{ref\_i} = (c_{ref\_i}, S_{ref\_i})$ The matrices of coefficients $A_i$ and $B_i$ are defined by the following equations.

$$A_j = \frac{\partial f(X_i, U_i)}{\partial X_i}\bigg|_{\substack{X_i = X_{ref_i} \\ U_i = U_{ref_i}}} = \begin{bmatrix} \frac{\partial f_{x_i}}{\partial x_i} & \frac{\partial f_{x_i}}{\partial y_i} & \frac{\partial f_{x_i}}{\partial \theta_i} & \frac{\partial f_{x_i}}{\partial \kappa_i} \\ \frac{\partial f_{y_i}}{\partial x_i} & \frac{\partial f_{y_i}}{\partial y_i} & \frac{\partial f_{y_i}}{\partial \theta_i} & \frac{\partial f_{y_i}}{\partial \kappa_i} \\ \frac{\partial f_{\theta_i}}{\partial x_i} & \frac{\partial f_{\theta_i}}{\partial y_i} & \frac{\partial f_{\theta_i}}{\partial \theta_i} & \frac{\partial f_{\theta_i}}{\partial \kappa_i} \\ \frac{\partial f_{\kappa_i}}{\partial x_i} & \frac{\partial f_{\kappa_i}}{\partial y_i} & \frac{\partial f_{\kappa_i}}{\partial \theta_i} & \frac{\partial f_{\kappa_i}}{\partial \kappa_i} \end{bmatrix}_{\substack{X_i = X_{ref_i} \\ U_i = U_{ref_i}}} = \begin{bmatrix} 1 & 0 & S_{ref\_i} \cdot \sin\left(\theta_{ref\_i} + \kappa_{ref_i} \cdot S_{ref\_i} + c_{ref\_i} \cdot \frac{S_{ref\_i}^2}{2}\right) & -\frac{S_{ref\_i}^2}{2} \cdot \sin\left(\theta_{ref\_i} + \kappa_{ref_i} \cdot S_{ref\_i} + c_{ref\_i} \cdot \frac{S_{ref\_i}^2}{2}\right) \\ 0 & 1 & S_{ref\_i} \cdot \cos\left(\theta_{ref\_i} + \kappa_{ref_i} \cdot S_{ref\_i} + c_{ref\_i} \cdot \frac{S_{ref\_i}^2}{2}\right) & -\frac{S_{ref\_i}^2}{2} \cdot \cos\left(\theta_{ref\_i} + \kappa_{ref_i} \cdot S_{ref\_i} + c_{ref\_i} \cdot \frac{S_{ref\_i}^2}{2}\right) \\ 0 & 0 & 1 & S_{ref\_i} \\ 0 & 0 & 0 & 0 \end{bmatrix} \quad \text{[Math 9]}$$

$$B_i = \frac{\partial f(X_i, U_i)}{\partial U_i}\bigg|_{\substack{X_i = X_{ref_i} \\ U_i = U_{ref_i}}} = \begin{bmatrix} \frac{\partial f_{x_i}}{\partial c_i} & \frac{\partial f_{x_i}}{\partial S_i} \\ \frac{\partial f_{y_i}}{\partial c_i} & \frac{\partial f_{y_i}}{\partial S_i} \\ \frac{\partial f_{\theta_i}}{\partial c_i} & \frac{\partial f_{\theta_i}}{\partial S_i} \\ \frac{\partial f_{\kappa_i}}{\partial c_i} & \frac{\partial f_{\kappa_i}}{\partial S_i} \end{bmatrix}_{\substack{X_i = X_{ref_i} \\ U_i = U_{ref_i}}} = \quad \text{[Math 10]}$$

$$\begin{bmatrix} -\frac{S_{ref\_i}^3}{2} \cdot \sin\left(\theta_{ref\_i} + \kappa_{ref_i} \cdot S_{ref\_i} + c_{ref\_i} \cdot \frac{S_{ref\_i}^2}{2}\right) & \cos\left(\theta_{ref\_i} + \kappa_{ref_i} \cdot S_{ref\_i} + c_{ref\_i} \cdot \frac{S_{ref\_i}^2}{2}\right) - S_{ref\_i} \cdot \sin\left(\theta_{ref\_i} + \kappa_{ref_i} \cdot S_{ref\_i} + c_{ref\_i} \cdot \frac{S_{ref\_i}^2}{2}\right) * (\kappa_{ref_i} + c_{ref\_i}, S_{ref\_i}) \\ -\frac{S_{ref\_i}^3}{2} \cdot \cos\left(\theta_{ref\_i} + \kappa_{ref_i} \cdot S_{ref\_i} + c_{ref\_i} \cdot \frac{S_{ref\_i}^2}{2}\right) & \sin\left(\theta_{ref\_i} + \kappa_{ref_i} \cdot S_{ref\_i} + c_{ref\_i} \cdot \frac{S_{ref\_i}^2}{2}\right) - S_{ref\_i} \cdot \cos\left(\theta_{ref\_i} + \kappa_{ref_i} \cdot S_{ref\_i} + c_{ref\_i} \cdot \frac{S_{ref\_i}^2}{2}\right) * (\kappa_{ref_i} + c_{ref\_i}, S_{ref\_i}) \\ \frac{S_{ref\_i}^2}{2} & \kappa_{ref_i} + c_{ref\_i} \cdot S_{ref\_i} \\ S_{ref\_i} & c_{ref\_i} \end{bmatrix}$$

The reference path is sampled so as to obtain a set of N reference points. For the set of N reference points over a given path, the following equation applies:

$$\tilde{X}_N = A_N \tilde{X}_1 + B_N \tilde{U}_N \quad \text{[Math 11]}$$

With:

$$A_N = \begin{bmatrix} A_1 \\ A_2 A_1 \\ \vdots \\ A_{N-2} A_{N-3} \ldots A_2 A_1 \\ A_{N-1} A_{N-2} \ldots A_2 A_1 \end{bmatrix} \quad \text{[Math 12]}$$

-continued $$B_N = \begin{bmatrix} B_1 & 0 & \cdots & 0 \\ A_2B_1 & B_2 & \cdots & 0 \\ \vdots & \vdots & \ddots & \vdots \\ A_{N-2}A_{N-3}\cdots A_2B_1 & A_{N-3}A_{N-4}\cdots A_3B_2 & \cdots & 0 \\ A_{N-1}A_{N-2}\cdots A_2B_1 & A_{N-2}A_{N-3}\cdots A_3B_2 & \cdots & B_{N-1} \end{bmatrix}$$ [Math 13]

$$\tilde{X}_N = \begin{bmatrix} \tilde{X}_2 \\ \tilde{X}_3 \\ \vdots \\ \tilde{X}_N \end{bmatrix} \text{ and } \tilde{U}_N = \begin{bmatrix} \tilde{U}_1 \\ \tilde{U}_2 \\ \vdots \\ \tilde{U}_{N-1} \end{bmatrix}$$ [Math 14]

In order to find a path which is close to the reference path, with no loss of the clothoid form, and subject to the constraints of controllability, our research problem is reformulated as that of an optimization calculation, in which the cost function is:

$$J = \tilde{X}_N^T \bar{Q} \tilde{X}_N + \tilde{U}_N^T \bar{R} \tilde{U}_N$$ [Math 15]

The cost function J is subject to the following condition:

$$\tilde{U}_N \in U$$ [Math 16]

U is the set of definition of the decision variable $\tilde{U}_N$. This set is determined based on the constraint regarding the controllability of the system, which will be detailed in the equations ([Math 25]-[Math 26]).

In the cost function, $\bar{Q}$ and $\bar{R}$ are weighting coefficients in which $$\bar{Q} = \mathrm{diag}\,(\underbrace{Q, \ldots, Q}_{N\,\mathrm{matrices}\,Q})$$

and $$\bar{R} = \mathrm{diag}\,(\underbrace{R, \ldots, R}_{N\,\mathrm{matrices}\,R})$$

The matrices Q, R are diagonal matrices of 4×4 size.

The cost function ([Math 15]) will be able to be developed in the form of a quadratic optimization problem with constraint ([Math 16]) in which it is sought to minimize J:

$$J = \frac{1}{2} \tilde{U}_N^T \bar{H} \tilde{U}_N + \bar{F}^T \tilde{U}_N + d$$ [Math 17]

In which $$\bar{H} = 2(B_N^T \bar{Q} B_N + \bar{R})$$ [Math 18]

$$\bar{F} = 2 B_N \bar{Q} A_N \tilde{X}_1$$ [Math 19]

$$d = \tilde{X}_1 A_N^T \bar{Q} A_N \tilde{X}_1$$ [Math 20]

With no loss of generality, the term "d" can be eliminated in the equation ([Math 17]).

The problem of searching for the refined path (close to the reference path defined by the French patent application document FR2003457 dated 7 Apr. 2020) is formulated here in a way similar to a conventional quadratic optimization problem.

By contrast, the constraints of controllability and the limit of the refined path (in terms of maximal overshoot, of final heading, etc.) will be discussed later in the description.

By solving the equations [Math 17] to [Math 20], a path will be obtained which is close to the reference path, having a clothoid form, which satisfies the constraints of controllability. However, that does not guarantee the assurance of finding a path which fully meets the service to the system and the driving sensation from the point of view of the driver. In this part, the constraints on the states of the system (like the maximum lateral deviation value and the final heading) are taken into account in the refined reference path optimization to avoid the problem of turning in the wrong direction upon activation of the AES function. Consequently, hereinbelow, certain constraints are added to the optimization problem.

A first constraint is a constraint of equality which relates to the abscissa x (longitudinal displacement of the vehicle) of the points of the path sought for which the value must be identical to that of the points in the reference path:

$$x_i = x_{ref\_i} \forall i = 1, \ldots, N$$ [Math 21]

This constraint of equality makes it possible to ensure the smoothing, that is to say the continuity, of the path found.

The following constraints are constraints of inequality. Thus, a second constraint relates to the maximum overshoot from the improved path, and the lateral displacement of the points of the improved path must be less than the lateral displacement $Y_{max}$ of the extreme line not to be exceeded upon a correction:

$$y_i \leq Y_{max} \forall i = 1, \ldots, N$$ [Math 22]

The final value of the lateral displacement of the improved path must always be greater than or equal to the final value of the lateral displacement targeted by the reference path:

$$y_N \geq y_{ref\_N}$$ [Math 23]

A third constraint relates to the steering wheel angle corresponding to the path sought which should be bounded in terms of gradient and magnitude such that the constraints of controllability are satisfied throughout the path. Knowing that an exact link between the steering wheel angle and the decision variable is not available, an approximation based on the bicycle model is used.

A relationship is then obtained between the steering wheel angle and the curvature:

$$\delta_i = \mathrm{Ratio\_DAE} *$$ [Math 24]

$$\left[ (l_f + l_r) + \left( \frac{l_r}{C_f} + \frac{l_f}{C_r} \right) * \frac{m}{l_f + l_r} * v^2 \right] * \kappa_i \forall i = 1 \ldots, N$$

A relationship is also obtained between the speed of rotation of the steering wheel and the curvature:

$$\dot{\delta}_i = \mathrm{Ratio\_DAE} *$$ [Math 25]

$$\left[ (l_f + l_r) + \left( \frac{l_r}{C_f} + \frac{l_f}{C_r} \right) * \frac{m}{l_f + l_r} * v^2 \right] * v * c_i \forall i = 1, \ldots, N$$

With:
  $\delta_i$: the steering wheel angle at the point i (in the Cartesian plane)
  $\dot{\delta}_i$: the speed of rotation of the steering wheel at the point i
  $l_f$ and $l_r$: are, respectively, the distances from the center of gravity of the vehicle to the front and rear axles
  m: is the weight of the vehicle
  $C_f$, $C_r$: drift rigidities of the front and rear wheels
  v: speed of the vehicle
  $c_i$: speed of curvature of the point i Ratio_DAE: ratio between the steering wheel angle and that of the wheels The constraints on the steering wheel angle and its speed are expressed as follows:

$$\frac{\delta_{min}}{\text{Ratio}_{DAE}*\left[(l_f+l_r)+\left(\frac{l_r}{C_f}+\frac{l_f}{C_r}\right)*\frac{m}{l_f+l_r}*v^2\right]} \leq \kappa_i \leq$$

$$\frac{\delta_{max}}{\text{Ratio}_{DAE}*\left[(l_f+l_r)+\left(\frac{l_r}{C_f}+\frac{l_f}{C_r}\right)*\frac{m}{l_f+l_r}*v^2\right]} \forall i=1,\ldots,N \quad \text{[Math 26]}$$

$$\frac{\dot{\delta}_{min}}{\text{Ratio}_{DAE}*\left[(l_f+l_r)+\left(\frac{l_r}{C_f}+\frac{l_f}{C_r}\right)*\frac{m}{l_f+l_r}*v^2\right]*v} \leq \dot{\kappa}_i \leq$$

$$\frac{\dot{\delta}_{max}}{\text{Ratio}_{DAE}*\left[(l_f+l_r)+\left(\frac{l_r}{C_f}+\frac{l_f}{C_r}\right)*\frac{m}{l_f+l_r}*v^2\right]*v} \forall i=1,\ldots,N \quad \text{[Math 27]}$$

With:

$\delta_{max}$, $\delta_{min}$, $\dot{\delta}_{max}$ and $\dot{\delta}_{min}$: the known controllability constraints.

The final value of the steering wheel angle must be within an acceptable range to ensure the stabilization of the path of the vehicle after the avoidance of the obstacle:

$$\Delta_{final\_min} \leq \delta_N \leq \Delta_{final\_max} \quad \text{[Math 28]}$$

At the time of the values of offset $\bar{x}$ of the longitudinal displacement at the start of the correction, the steering wheel angle must be greater than or equal to the angle value at the moment of activation of the AES. It should be noted that the moment of activation of the AES corresponds to the moment of activation of the control method. The same constraint is applied to the lateral deviation of the vehicle. These constraints are added in order to avoid directing the vehicle toward its reference path when the AES is activated and the heading of the vehicle is non-zero at that moment. It should be noted that the longitudinal displacement value x is not determined during the optimization calculation, but in the optimization strategy posed in the equation [Math 37] explained below:

$$\delta_i \geq \delta_1 \forall i=1,\ldots,n \quad \text{[Math 29]}$$

$$y_i \geq y_1 \forall i=1,\ldots,n \quad \text{[Math 30]}$$

With: n corresponding to the longitudinal displacement $\bar{x}$.

A fourth constraint relates to the stabilization of the path of the vehicle after the avoidance through the final value of the heading of the vehicle, which should be situated within a sufficiently small range. The aim of adding this type of constraint is to avoid the case where the optimal solution cannot be found. This type of constraint is often called "relaxed constraint" or "soft constraint" and the addition of it requires a modification to the cost function ([Math 17]) and the decision vector $\tilde{U}_N$. Thus, the document "Soft constraints and exact penalty functions in model predictive control, Eric C. Kerrigan, Jan M. Maciejowski, UKACC, Cambridge (2000)", includes this type of constraint in the control. The addition of this relaxed constraint also makes it possible to make the heading of the vehicle at the end of the path converge toward a range of desired values.

The equation ([Math 17]) is then re-expressed as follows:

$$J = \frac{1}{2}\tilde{U}_N^T \bar{H} \tilde{U}_N + \bar{F}^T \tilde{U}_N + \epsilon^2 \rho = \quad \text{[Math 31]}$$

$$\tilde{U}_N^{*T}\left(\frac{1}{2}\bar{H} + C_{relax\_1}^T \rho C_{relax\_1}\right)\tilde{U}_N^* + \bar{F}^T C_{relax\_2} \tilde{U}_N^*$$

With:

$$\tilde{U}_N^* \begin{bmatrix} \tilde{U}_N \\ \epsilon \end{bmatrix} \quad \text{[Math 32]}$$

$$C_{relax\_1} = \underbrace{[0 \; \ldots \; 0 \; 1]}_{N\,elements} \quad \text{[Math 33]}$$

$$C_{relax\_2} = \underbrace{\begin{bmatrix} 1 & 0 & \ldots & 0 \\ \vdots & \ddots & \ddots & \vdots \\ 0 & \ldots & 1 & 0 \end{bmatrix}}_{N\,elements} (N-1) \text{ elements} \quad \text{[Math 34]}$$

$\varepsilon$: relaxation variable
$\rho$: the weighting parameter for $\epsilon$
In addition, $$(\theta_{min} - \theta_{ref\_N}) - V.C_{relax\_1}\tilde{U}_N^* \leq \tilde{\theta}_N \leq (\theta_{max} - \theta_{ref\_N}) + V.C_{relax\_1}\tilde{U}_N^* \quad \text{[Math 35]}$$

With $$\tilde{\theta}_N = \begin{bmatrix} \theta_1 - \theta_{ref\_1} \\ \vdots \\ \theta_N - \theta_{ref\_N} \end{bmatrix} \quad \text{[Math 36]}$$

$\theta_{min}$ and $\theta_{max}$ are, respectively, the acceptable extrema of the heading at the end of the path.

Assume:

$\theta_{ref\_N}$: the heading at the last point in the reference path
V: a weighting parameter.

On the basis of the above theoretical developments, an optimized decision vector $\tilde{U}_N^*$ is determined, expressed in the equation [Math 32] by solving the optimization problem posed in the following equation [Math 37] subject to the constraints defined by the equations [Math 21] to [Math 23], [Math 26] to [Math 30] and [Math 35]. A decision vector is considered to be optimized when the associated cost J determined by application of the equation [Math 31] reaches a minimum.

$$\underset{\tilde{U}_N^*}{\text{argmin}} \frac{1}{2}\tilde{U}_N^T \bar{H} \tilde{U}_N + \bar{F}^T \tilde{U}_N + \epsilon^2 \rho = \quad \text{[Math 37]}$$

$$\tilde{U}_N^{*T}\left(\frac{1}{2}\bar{H} + C_{relax_1}^T \rho C_{relax_1}\right)\tilde{U}_N^* + \bar{F}^T C_{relax_2} \tilde{U}_N^*$$

Note that the solving of the optimization problem posed in the equation [Math 37] is effectively advantageous and essential for the AES controller if the initial heading of the vehicle is positive in an avoidance on the left. If it is negative, the original reference path (without recalculation) is already sufficient for a complete avoidance on the left, with the right direction of lock on the steering wheel. For an avoidance on the right, the cases of negative initial heading will be considered. Thus, for an avoidance on the right, the clothoids derived from the refinement only in the case where the heading of the vehicle is strictly negative will be considered. In the case of avoidance on the right with zero or positive initial heading, the system is stable without needing path refinement. Furthermore, the initial curvature can be used instead of the initial steering wheel angle by applying the relationship between the steering wheel angle and the curvature described in the equation ([Math 24]).

The determination of the consistency of the behavior of the steering wheel with what the driver expects (steps 5 and 12 below) can be verified, for an avoidance on the left, by counting the number of negative extrema of the angle profile, when the initial heading is positive. For the case of avoidance on the right, similarly, the number of positive extrema are counted. If there is more than one negative extremum, it is considered that the steering wheel angle profile is not suited to the driver criterion. Indeed, under the assumption that, when there is no longer a negative extremum on the steering wheel angle profile, the first serves to bring the vehicle closer to the reference path even if the system is currently performing an avoidance. This behavior of the system cannot be accepted by the driver. In this case, to eliminate this unexpected behavior, the offset value of the longitudinal displacement $\bar{x}$ is increased by increasing it by $\Delta \bar{x}$ until there remains only a single negative extremum on the angle profile.

The initial value of the lateral deviation of the path sought will be offset by a lateral offset value $y_{L\_ref\_init}$. This offset value is defined before solving the optimization problem posed in the equation [Math 37]. The lateral offset value is calculated such that the angle request $\delta_{request}$ from the robust controller of the AES on activation is equal to the measured steering wheel angle $\delta(t_0)$.

Therefore:

$$y_{L\_ref\_init} \approx D_{Look\,Ahead} \cdot \sin(\theta(t_0)) + \frac{1}{K_{y_L} \cdot \text{Ratio\_DAE}} \quad [\text{Math 38}]$$
$$(-\delta_{request}(t_0) + K_\delta \cdot \delta(t_0) + K_\theta \cdot \text{Ratio\_DAE} \cdot \theta(t_0))$$

In which
$\delta_{request}(t_0) = \delta(t_0)$;
$\theta(t_0)$: the heading of the steering wheel measured on activation of the system;
$\delta(t_0)$: the angle of the steering wheel measured on activation of the system;
$K_{y_L}$: the gain of the AES controller corresponding to the lateral deviation of the vehicle,
$K_\delta$: the gain of the AES controller corresponding to the steering wheel angle of the vehicle,
$K_\theta$: the gain of the AES controller corresponding to the heading of the vehicle, and
$D_{LookAhead}$: the projected distance in the Cartesian plane of the vehicle.

The distance $D_{LookAhead}$ corresponds to the product of the time to collision TTC and the speed of the vehicle. To reduce the complexity of implementation, it is assumed that the initial steering wheel angle is very small and can be considered as equal to 0 in this study case. Consequently, the equation ([Math 38]) becomes:

$$y_{L\_ref\_init} = D_{Look\,Ahead} \cdot \sin(\theta(t_0)) + \frac{1}{K_{y_L}} K_\theta \cdot \theta(t_0) \quad [\text{Math 39}]$$

Furthermore, to ensure the final path does not cross the improved path, a constraint of inequality is added in the optimization problem posed in the equation [Math 37], which does not allow the lateral deviation of the solution to be less than that of the improved path.

Figure 2:
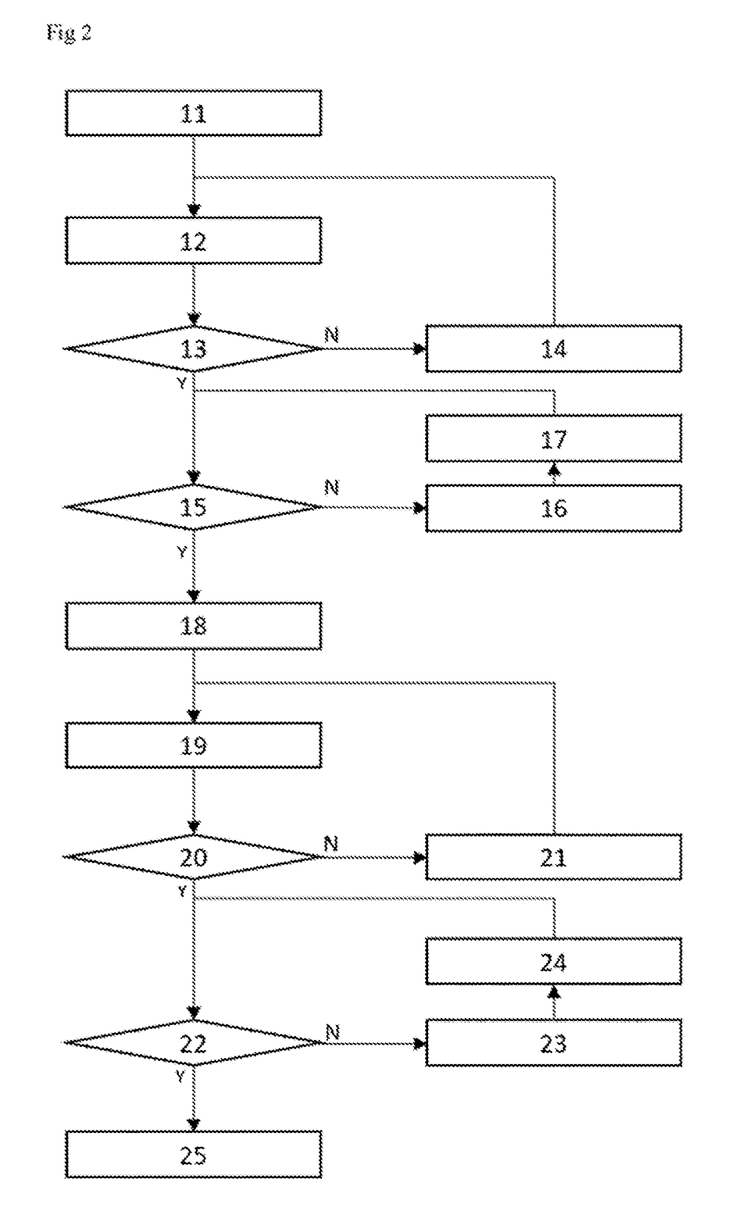
FIG. 2 illustrates the main substeps of the path refinement according to the present invention.

The main substeps of the calculation step 4 for the refinement of an avoidance path, illustrated by FIG. 2, will now be described.

In a first substep 11, a reference path is obtained from the step of determination 3 of a target avoidance path and from the data of the merging step 2. Initialization parameters are then determined as a function of the reference path (reference longitudinal displacement $x_{ref}$, reference lateral displacement $y_{ref}$, reference heading of the vehicle $\theta_{ref}$, reference curvature of the path of the vehicle $\kappa_{ref}$), and from the merged data (the initial heading of the vehicle $\theta_{init}$ on activation t, and the initial angle of the steering wheel $\delta_{init}$ at the instant of activation t) and the variables ITER, ITER2 and ITER3 are initialized at zero.

In a second substep 12, the cost optimization problem described by the equation [Math 37] is solved subject to the constraints defined by the equations [Math 21] to [Math 23], [Math 26] to [Math 30] and [Math 35] with the determined initialization parameters.

In a third substep 13, a determination is made as to whether the optimized decision vector $\widetilde{U}^*_N$ solves the equation [Math 37] while being associated with a minimum of the cost function J [Math 31], whether the constraint on the final heading $\tilde{\theta}_N$ defined by the equation [Math 35] is satisfied and whether the product of the ITER variable with the value $\Delta t$ is less than a predefined value, notably a time to collision TTC received from the merging step 2.

If such is not the case, the method continues with a fourth substep 14 during which the ITER variable is incremented by one unit, the reference path is extended by a duration equal to ITER times $\Delta t$. The method then resumes at the second substep 12.

If, in the third substep 13, it has been determined that an optimal solution exists and that the constraint on the final heading is satisfied, the method is continued with a fifth substep 15, during which a determination is made as to whether the behavior of the steering wheel is consistent with what the driver expects. To determine that, the steering wheel angle profile $\delta_i$ is determined, from the instant of activation of the AES then by determining whether the sign of the steering wheel angle associated with the first extremum of the steering wheel angle profile has the same sign as the sign of the steering wheel angle of the reference path and whether there is at most an extremum of sign opposite the first extremum over the duration of the optimized path.

If the behavior of the steering wheel is not consistent with what the driver expects, the method continues with a sixth substep 16 during which the ITER2 variable is incremented by one unit, and the offset value of the longitudinal displacement $\bar{x}$ is increased by $\Delta \bar{x} = v \cdot \Delta \bar{t} \cdot \text{ITER2}$, then, by a seventh substep 17 during which the cost optimization problem described by the equation [Math 37] is again solved, subject to the constraints described by the equations ([Math 21]-[Math 23]), ([Math 26]-[Math 30]) and ([Math 35]) with the initialization parameters determined in the substep 13 and the longitudinal displacement increased. It resumes at the fifth substep 15.

If the behavior of the steering wheel is consistent with what the driver expects in the fifth substep 15, the method is continued with an eighth substep 18 during which it is considered that the last determined path is the improved path.

If the method were to stop here, the improved paths found would not yet be sufficient to avoid the problem of wrong direction of lock of the steering wheel upon the activation of the AES. To overcome this problem, the following steps of the method make it possible to ensure the rotation of the steering wheel in the expected direction and to do so regardless of the speed.

The method continues with a ninth substep 19, during which the cost optimization problem described by the equation [Math 37] is solved again, subject to the constraints described by the equations ([Math 21]-[Math 23], [Math 26]-[Math 30] and [Math 35]) with an offset $y_{L\_ref\_int}$ defined by the equation [Math 39], by considering the improved path to be reference path and by reinitializing the ITER2 variable. In other words, the cost optimization problem is solved with initialization parameters defined as a function of the improved path.

During a tenth substep 20, a determination is made as to whether an optimal solution exists by determining if the optimized decision vector $\widetilde{U}^*_N$ solves the equation [Math 37] while being associated with a minimum of the cost function J [Math 31] and if the lateral displacement of the solution path is greater than the lateral displacement of the improved path. It should be noted that the final heading is no longer here a constraint in determining an optimal solution because only the initial portion of the improved path is modified, the improved path already satisfying the constraints on the final heading.

If such is not the case, the method is continued with an eleventh substep 21 during which the ITER3 variable is incremented by one unit, and the initial heading $\theta_{init}$ is reduced by $\Delta\theta \cdot ITER3$. The value $\Delta\theta$ is predetermined, notably as a function of the sensitivity of the heading sensor and through a campaign of testing. The method then resumes at the ninth substep 19.

If it is determined in the substep 20 that an optimal solution exists, the method continues with a twelfth substep 22, during which a determination is made as to whether the behavior of the driver is consistent with what the driver expects, in a way similar to the determination made in the substep 23.

If the behavior of the steering wheel is not consistent with what the driver expects, the method continues with a thirteenth substep 23 during which the ITER2 variable is incremented by one unit, the offset value of the longitudinal displacement x is increased by $\Delta\bar{x}=v\cdot\Delta\bar{t}\cdot ITER2$. The method continues with a fourteenth substep 24 during which the cost optimization problem described by the equation [Math 37] is solved again, subject to the constraints described by the equations ([Math 21]-[Math 23], [Math 26]-[Math 30] and [Math 35]) with initialization parameters comprising the increased longitudinal displacement. The method then resumes at the twelfth substep 22.

If the behavior of the steering wheel is consistent with what the driver expects in the twelfth substep 22, the method continues with a fifteenth substep 25 during which it is considered that the last determined path is the final path.

It should be noted that the predetermined duration, the angular deviation, and the longitudinal offset are incremented successively by predetermined limit values. If such is the case, the refinement step is interrupted and the reference path is taken in the step of control of the vehicle.

This control method makes it possible to improve the path following stability and the service to the client, with a rotation of the steering wheel in the expected direction. The maneuver duration is also reduced with the proposed method.

The invention claimed is:

1. A method for controlling a motor vehicle for avoidance of a target, the motor vehicle being provided with at least two perception sensors, the control method comprising:
   determining data from the at least two sensors,
   merging the data from the at least two sensors so as to determine at least a steering wheel angle, a speed of the vehicle and a heading of the vehicle,
   planning of a target avoidance path in the form of a clothoid,
   refining the target avoidance path as a function of the steering wheel angle, the speed of the vehicle and the heading of the vehicle and based on solving of an optimization problem,
   controlling the vehicle so as to implement the refined path,
   the refining the target avoidance path comprising a first series of substeps to further improve the avoidance path as a function of a length of the path, of a direction of rotation of the steering wheel, and of a final heading and a second series of substeps to refine the further improved path as a function of an initial heading and of the direction of rotation of the steering wheel,
   wherein the first series of substeps comprises the following substeps:
      initialization parameters of the optimization problem are determined as a function of the reference path and of the data from the merge, the initialization parameters comprising a reference longitudinal displacement, a reference lateral displacement, a reference vehicle heading, a reference vehicle path curvature, an initial heading of the vehicle, and an initial steering wheel angle,
      the optimization problem is solved and a determination is made as to whether an optimal solution exists by determining when the solution of the optimization problem corresponds to a minimum of a predefined cost function and when the solution of the optimization problem satisfies a constraint on the final heading of the vehicle,
      when the solution of the optimization problem corresponds to the minimum of the predefined cost function and when the solution of the optimization problem satisfies the constraint on the final heading of the vehicle, the steering wheel angle profile is determined from the instant of activation of the control method, then a determination is made as to whether the sign of the steering wheel angle associated with a first extremum of the steering wheel angle profile has the same sign as the sign of the steering wheel angle of the reference path and when there is a sign opposite the sign of the steering wheel angle associated with the first extremum over the duration of the optimized path; when such is the case, the solution of the optimization problem is considered as an improved path, and
   wherein a constraint of the optimization problem is that a final value of the lateral displacement of the improved path is greater than or equal to the final value of the lateral displacement targeted by the reference path.

2. The control method as claimed in claim 1, wherein the optimization problem is a function of a reference longitudinal displacement, of a reference lateral displacement, of a reference vehicle heading, of a curvature of the path of the reference vehicle and of a decision vector comprising the speed of variation of the curvature of the path and the distance travelled with respect to the origin and of empirically determined setting parameters, and of constraints on the initial longitudinal displacement, on an initial lateral displacement, on a final lateral displacement, on the steering wheel angle, on the speed of rotation of the steering wheel and on the final heading value.

3. The control method as claimed in claim 1, wherein, when it is determined that an optimal solution does not exist, the path is extended by a predetermined duration, then the method is resumed at the solving of the optimization problem by taking account of the path extension, the predetermined duration being increased on each successive occurrence of determination that an optimal solution does not exist.

4. The control method as claimed in claim 1, wherein, when the steering wheel angle profile is not satisfactory because the sign of the steering wheel angle associated with a first extremum of the steering wheel angle profile is not the same sign as the sign of the steering wheel angle of the reference path, a longitudinal offset is applied to the reference path, and the optimization problem is solved again, then the method is resumed at the determination of the steering wheel angle profile, the longitudinal offset being increased on each successive occurrence of determination that the steering wheel angle profile is not satisfactory.

5. The control method as claimed in claim 1, wherein a constraint of the optimization problem is that the longitudinal displacement of the points of the improved path must be equal to the longitudinal displacement of the points in the reference path.

6. The control method as claimed in claim 1, wherein a constraint of the optimization problem is that the final value of the heading of the vehicle of the improved path must lie within a restricted range of values.

7. The control method as claimed in claim 1, wherein a constraint of the optimization problem is that the lateral displacement of the points of the improved path must be less than the lateral displacement of an extreme line not to be exceeded upon a correction.

8. The control method as claimed in claim 1, wherein the second series of substeps comprises the following substeps:
  new initialization parameters are determined as a function of the improved path and of the merging data, a predetermined lateral offset is applied to the improved path and the optimization problem is solved,
  a determination is made as to whether an optimal solution exists by determining when it corresponds to a minimum of a predefined cost function,
  when such is the case, the steering wheel angle profile is determined from the instant of the control method and a determination is made as to whether the sign of the steering wheel angle associated with the first extremum of the steering wheel angle profile has the same sign as the sign of the steering wheel angle of the reference path and when there is at most an extremum of a sign opposite the first extremum over the duration of the optimized path; when such is the case, the solution of the optimization problem is considered as a final refined path.

9. The control method as claimed in claim 8, wherein, when it is determined that an optimal solution does not exist, the initial heading is reduced by a predetermined angular deviation then the method is resumed at the solving of the optimization problem, the angular deviation being increased on each successive occurrence of that an optimal solution does not exist.

10. The control method as claimed in claim 8, wherein, when it is determined that the optimal solution does not satisfy the steering wheel angle constraints, a longitudinal offset is applied to the improved path, the optimization problem is solved, then the method is resumed at the determination of the steering wheel angle profile, the longitudinal offset being increased on each successive occurrence of determination that the steering wheel angle profile is not satisfactory.

11. The control method as claimed in claim 1, wherein the predetermined duration, the angular deviation and the longitudinal offset are incremented successively up to predetermined limit values; when such is the case, the refining is interrupted and the reference path is implemented during the controlling.

12. A system for controlling a motor vehicle for avoidance of a target, comprising
  the at least one two perception sensors, and
  at least one computation means configured to perform the control method as claimed in claim 1.

* * * * *